United States Patent [19]

Arthur

[11] Patent Number: 5,073,176
[45] Date of Patent: Dec. 17, 1991

[54] DICARBOXYLIC ACID POLYESTERS AND POLYAMIDES FOR FLUID SEPARATION MEMBRANES

[75] Inventor: Samuel D. Arthur, Wilmington, Del.

[73] Assignee: E. I. Du Pont de Nemours and Company, Wilmington, Del.

[21] Appl. No.: 609,443

[22] Filed: Nov. 5, 1990

[51] Int. Cl.$^5$ .................... B01D 53/22; B01D 71/56
[52] U.S. Cl. ............................ 55/16; 55/68; 55/158; 210/644; 210/649; 210/500.38
[58] Field of Search ............... 55/16, 158, 66, 68, 55/71, 73; 210/500.23, 500.27, 500.38, 644, 649, 650

[56] References Cited

U.S. PATENT DOCUMENTS

| Re. 30,351 | 7/1980 | Hoehn et al. | 55/16 |
|---|---|---|---|
| 2,715,620 | 8/1955 | Cariston et al. | 260/78 |
| 3,328,352 | 6/1967 | Kwolek | 260/47 |
| 3,365,425 | 1/1968 | Watson | 260/75 |
| 3,426,001 | 2/1969 | Ridgway | 260/78 |
| 3,522,215 | 7/1970 | Sardessai et al. | 260/75 |
| 3,546,165 | 12/1970 | Morgan | 260/47 |
| 3,565,865 | 2/1971 | Meyer | 260/75 |
| 3,657,185 | 4/1972 | Wear | 260/47 |
| 3,899,309 | 8/1975 | Hoehn et al. | 55/16 |
| 4,275,188 | 6/1981 | Berger et al. | 528/193 |
| 4,463,160 | 7/1984 | Mark et al. | 528/176 |
| 4,473,682 | 9/1984 | Calundann et al. | 524/605 |
| 4,751,128 | 6/1988 | Portugall et al. | 528/193 |
| 4,968,331 | 11/1990 | Sakashita et al. | 55/158 |

FOREIGN PATENT DOCUMENTS

| 0112134 | 6/1984 | European Pat. Off. | 55/158 |
|---|---|---|---|
| 112134 | 6/1984 | European Pat. Off. | |
| 244126 | 4/1987 | European Pat. Off. | |
| 142407 | 6/1978 | Japan . | |
| 55-134629 | 10/1980 | Japan | 55/158 |
| 092192 | 1/1982 | Japan . | |
| 60-000803 | 1/1985 | Japan | 55/158 |
| 084657 | 10/1986 | Japan . | |
| 124545 | 10/1986 | Japan . | |
| 63-305918 | 12/1988 | Japan | 55/158 |
| 1-2344 | 7/1989 | Japan . | |
| 1-207416 | 8/1989 | Japan | 55/158 |
| 552143 | 8/1984 | U.S.S.R. . | |

OTHER PUBLICATIONS

Yang et al., "Preparation and Properties of Polyarylates from 5-t-Butylisophthaloyl Chloride and Various Bisphends", (1990), pp. 1353–1359.

Primary Examiner—Robert Spitzer

[57] ABSTRACT

Polyester and polyamide membranes having improved permeation properties are disclosed. The membranes are derived from t-butyl-substituted isophthaloyl halide, in particular, 5-t-butylisophthaloyl chloride. The t-butyl-substituted isophthaloyl chloride can be employed with monomers such as diols and diamines to provide polyesters and polyamides with improved permeation properties.

23 Claims, No Drawings

DICARBOXYLIC ACID POLYESTERS AND POLYAMIDES FOR FLUID SEPARATION MEMBRANES

FIELD OF THE INVENTION

This invention relates to the field of fluid separation membranes. In particular, this invention relates to membranes formed from dicarboxylic acid chlorides for gas separation.

BACKGROUND OF THE INVENTION

Semipermeable membranes for fluid separations are well known in the art. These membranes typically are either dense or asymmetric membranes that include a dense separating layer.

The semipermable membranes of the prior art may be polymers of aromatic imides, aromatic esters, and aromatic amides. Membranes of the prior art such as polyester membranes can be derived from bisphenol A and mixtures of iso- and tere-phthaloyl chlorides. Aromatic polyesters prepared from iso/tere-phthalic acids or their halogen derivatives, with substituted biphenols also are known. These polymers, however, are subject to specific structural requirements.

The polyester membrane compositions of the prior art, although useful as gas separating membranes, not only suffer from the disadvantages of having to satisfy specific structural constraints, but also are difficult to fabricate into configurations such as hollow fiber membranes since these compositions tend to be soluble in relatively few solvents. Moreover, the membranes of the prior art tend to have relatively low flux.

A need therefore exists for fluid separation membranes that avoid the fabrication and solubility problems of the prior art but also provide improved gas separation properties.

SUMMARY OF THE INVENTION

Polyester and polyamide membranes having improved permeation properties are disclosed. The membranes are derived from t-alkyl substituted isophthaloyl halide, in particular, 5-t-butylisophthaloyl chloride. The t-butyl-substituted isophthaloyl halide can be employed with monomers such as diols, diamines, and mixtures of dicarboxylic acid halides to provide polyester, and polyamide membranes with improved permeation properties.

The selectively permeable membranes of the invention are provided by preparing a solution of dicarboxylic acid halide, mixing the solution with monomers such as biphenols, aromatic diols, aromatic diamines, or mixtures thereof to form a second solution, treating the second solution to form a polymer of the dicarboxylic acid halide and the monomer, forming a third solution of that polymer, and casting the third solution to form the selectively permeable membrane.

The selectively permeable membranes of the invention have a wide variety of uses in fluid separations, particularly for gas separations wherein a mixture of gas contacts the membrane whereby the more permeable component of the mixture passes through the membrane and is separated from the mixture.

DETAILED DESCRIPTION OF THE INVENTION

Having briefly summarized the invention, the invention will now be described in detail by reference to the following specification and non-limiting examples. Unless otherwise specified, all percentages are by weight and all temperatures are in degrees Celsius.

Generally, the membranes of this invention are based on polyesters and polyamides. The polyesters have the general formula:,

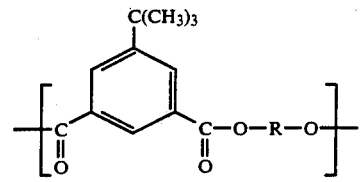

where R=divalent organic group.

The polymers employed to form the polyester membranes of the invention are derived from alkyl-substituted dicarboxylic acid halides, preferably dicarboxylic acid chlorides such as t-butylisophthaloyl chlorides with monomers such as aromatic diols, aliphatic diols or aromatic biphenols. Examples of aromatic diols may include resorcinol, tetrachlorobisphenol A, tetrabromobisphenol A, tetramethylbisphenol A, tetramethylbisphenol AF, t-butylhydroquinone, 9,9-bis(trifluoromethyl) xanthene-3,6-diol, 2-methylresorcinol, and the like; aliphatic diols may include ethylene glycol; propylene glycol; 1,4-butanediol; 1,3-butanediol; 2-butene-1,4-diol; 1,2-cyclohexanediol; 1,3-cyclohexanediol; 1,4-cyclohexanediol, and the like; aromatic biphenols may include 4,4,'-dihydroxybiphenyl, 3,4,'-dihydroxybiphenyl; 3,3,'-dimethyl-4,4,'-dihydroxybiphenyl; 3,3',5,5-tetramethyl-4,4'-dihydroxybiphenyl; 2,2',3,3',5,5'-hexamethyl-4,4'-dihydroxybiphenyl; 3,3'-dibromo-4,4'-dihydroxybiphenyl; 3,3'-dichloro-4,4'-dihydroxybiphenyl, and the like. Examples of t-butylisophthaloyl chlorides which may be employed to form the polyesters of the invention include 5-t-butylisophthaloyl chloride, 2-t-butylisophthaloyl chloride, 4-t-butylisophthaloyl chloride, and the like.

The R substituent of the polyesters of the invention can be either aliphatic or aromatic. Examples of suitable R substituents may include $\geq$C2 aliphatics, $\geq$C4 cyclo aliphatics, monocyclic aromatics, poly-cyclic aromatics, alkyl-substituted monocyclic aromatics, aryl-substituted monocyclic aromatics, halo-substituted monocyclic aromatics, alkyl-aryl substituted aromatics, alkyl-substituted polycyclic aromatics, aryl-substituted polycyclic aromatics, and halo-substituted polycyclic aromatics. Examples of $\geq$C2 aliphatics may include 1,2-ethanediyl, 1,2-propanediyl, 1,3-propanediyl, 1,4-butanediyl, 1,3-butanediyl, 2-butene-1,4-diyl, 2,2-dimethylpropane-1,3-diyl and the like. Examples of $\geq$C4 cyclo aliphatics may include 1,2-cyclobutanediyl, 1,3-cyclobutanediyl, 1,3-cyclopentanediyl, 1,2-cyclohexanediyl, 1,3-cyclohexanediyl, 1,4-cyclohexanediyl, bicyclo(4.4.0)decane-1,5-diyl. Monocyclic aromatics may include pyridine, benzene, triazine and the like. Poly-cyclic aromatics may include naphthalene, anthracene, quinoline, phenanthrene, xanthene, fluorene, acridine, and the like. Alkyl-substituted monocyclic aromatics may include toluene, xylene, ethylbenzene, isopropylbenzene, t-butylbenzene, cyclohexylbenzene, indane, tetralin, methylpyridine, trifluoromethylbenzene, bis(trifluoromethyl)benzene, and the like. Aryl-substituted monocyclic aromatics may include biphenyl, pyridylbenzene, furylbenzene, thiofurylbenzene, tolylbenzene, xylylbenzene, chlorophenylbenzene, and the like. Halo-substituted monocyclic aromatics may include chlorobenzene, dichlorobenzene, bromobenzene, dibromobenzene, iodobenzene, chlorotoluene, bromotoluene, chloroxylene, fluorobenzene and the like.

Alkyl-aryl substituted aromatics may include diphenylmethane, triphenylmethane, diphenylethane, diphenylpropane, diphenylhexafluoropropane, bis(methylphenyl)methane, bis(methylphenyl)propane, bis(dimethylphenyl)propane, bis(trimethylphenyl)propane, bis(dimethylphenyl)hexafluoropropane, bis(chlorophenyl)methane, bis(dichlorophenyl)methane, bis(dichlorophenyl)propane, bis(dichlorophenyl)hexafluoropropane, bis(dibromophenyl)propane, and the like. Alkyl-substituted polycyclic aromatics may include methylnaphthalene, dimethylnaphthalene, ethylnaphthalene, t-butylnaphthalene, methylxanthene, dimethylxanthene, dimethylfluorene, methylanthracene, dimethylanthracene, trifluoromethylnaphthalene, bis(trifluoromethyl)xanthene, bis(trifluoromethyl)fluorene, and the like. Aryl-substituted polycyclic aromatics may include phenylnaphthalene, phenylanthracene, diphenylnaphthalene, diphenylxanthane, diphenylfluorene, tolylnaphthalene, chlorophenylnaphthalene, and the like. Halo-substituted polycyclic aromatics may include chloronaphthalene, bromonaphthalene, dichloronaphthalene, dichloroxanthene, dichlorofluorene, tetrachlorofluorene, and the like.

The polyamides of the invention have the general formula:

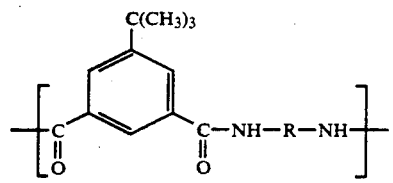

where R = divalent organic group.

The polymers employed to form the polyamide membranes of the invention are derived from alkyl-substituted dicarboxylic acid halides, preferably dicarboxylic acid chlorides such as t-butylisophthaloyl chlorides with monomers such as aromatic diamines. Examples of t-butylisophthaloyl chlorides which may be employed to form the polyamides of the invention include 5-t-butylisophthaloyl chloride, (BIPC) 2-t-butylisophthaloyl chloride, 4-t-butylisophthaloyl chloride, and the like, most preferably 5-t-butylisophthaloyl chloride, (BIPC), or BIPC together with monomers that are capable of forming copolymers with BIPC. The aromatic diamines may include, but are not limited to m-phenylenediamine, diaminomesitylene, bisaniline A, bisaniline AF (2,2-bis(4-aminophenyl)-1,1,1,3,3,3-hexafluoropropane), oxydianiline(4-aminophenyl ether), p-phenylenediamine, 2,3,5,6-tetramethyl-1,4-phenylenediamine, 1,5-naphthalenediamine, and the like.

The R substituent of the polyamides of the invention can be either aliphatic or aromatic. Examples of suitable R substituents may include >C2 aliphatics, ≧C4 cyclo aliphatics, monocyclic aromatics, poly-cyclic aromatics, alkyl-substituted monocyclic aromatics, aryl-substituted monocyclic aromatics, halo-substituted monocyclic aromatics, alkyl-aryl substituted monocyclic aromatics, alkyl-substituted polycyclic aromatics, aryl-substituted polycyclic aromatics, and halo-substituted polycyclic aromatics. Examples of ≧C2 aliphatics may include 1,2-ethanediyl, 1,2-propanediyl, 1,3-propanediyl, 1,4-butanediyl, 1,3-butanediyl, 2-butene-1,4-diyl, 2,2-dimethylpropane-1,3-diyl and the like. Examples of ≧C4 cyclo aliphatics include 1,2-cyclobutanediyl, 1,3-cyclobutanediyl, 1,3-cyclopentanediyl, 1,2-cyclohexanediyl, 1,3-cyclohexanediyl, 1,4-cyclohexanediyl, bicyclo(4.4.0)decane-1,5-diyl and the like. Monocyclic aromatics may include pyridine, benzene, triazine, and the like. Poly-cyclic aromatics may include naphthalene, anthracene, quinoline, phenanthrane, xanthane, fluorene, acridine, and the like. Alkyl-substituted monocyclic aromatics may include toluene, xylene, ethylbenzene, isopropylbenzene, t-butylbenzene, cyclohexylbenzene, indane, tetralin, methylpyridine, trifluoromethylbenzene, bis(trifluoromethyl)benzene, and the like. Aryl-substituted monocyclic aromatics may include biphenyl, pyridylbenzene, furylbenzene, thiofurylbenzene, tolylbenzene, xylylbenzene, chlorophenylbenzene, and the like. Halo-substituted monocyclic aromatics may include chlorobenzene, dichlorobenzene, bromobenzene, dibromobenzene, iodobenzene, chlorotoluene, bromotoluene, chloroxylene, fluorobenzene, and the like. Alkyl-aryl substituted aromatics may include diphenylmethane, triphenylmethane, diphenylethane, diphenylpropane, diphenylhexafluoropropane, bis(methylphenyl)methane, bis(methylphenyl)propane, bis(dimethylphenyl)propane, bis(trimethylphenyl)propane, bis(dimethylphenyl)hexafluoropropane, bis(chlorophenyl)methane, bis(dichlorophenyl)methane, bis(dichlorophenyl)propane, bis(dichlorophenyl)hexafluoropropane, bis(dibromophenyl)propane, and the like. Alkyl-substituted polycyclic aromatics may include methylnaphthalene, dimethylnaphthalene, ethylnaphthalene, t-butylnaphthalene, methylxanthene, dimethylxanthene, dimethylfluorene, methylanthracene, dimethylanthracene, trifluoromethylnaphthalene, bis(trifluoromethyl)xanthene, bis(trifluoromethyl)fluorene, and the like. Aryl-substituted polycyclic aromatics may include phenylnaphthalene, phenylanthracene, diphenylnaphthalene, diphenylxanthane, diphenylfluorene, tolylnaphthalene, chlorophenylnaphthalene, and the like. Halo-substituted polycyclic aromatics may include chloronaphthalene, bromonaphthalene, dichloronaphthalene, dichloroxanthene, dichlorofluorene, tetrachlorofluorene, and the like.

The BIPC that preferably is employed in the invention generally is prepared by reacting t-butyl-substituted isophthalic acid, preferably 5-t-butylisophthalic acid, or salts thereof, with $PCl_5$ in a solvent. Examples of suitable solvents include, but are not limited to, chlorobenzene, methylene chloride, and the like. Preferably, chlorobenzene is employed.

Generally, the polyester, and polyamide membranes of the invention are prepared by casting a solution of a polymer preferably derived from BIPC and a solvent therefore, and an additional monomer such as an aromatic diol, aliphatic diol, biphenol, or aromatic amine onto a glass plate. The choice of solvent for the polymer depends on the type of membrane being fabricated. For asymmetric membranes, the solvent is chosen primarily on the basis of its solvency for the polymer and its miscibility with the coagulating medium. For manufacture of dense membranes, the solvent is chosen on the basis of its solvency for the polymer and its ability to be removed from the separating layer. Accordingly, suitable solvents for use in the manufacture of the membranes of the invention include, but are not limited to, amide solvents such as dimethylformamide (DMF), N-methyl-2-pyrrolidone (NMP), dimethylacetamide (DMAC) and the like, ether solvents such as tetrahydrofuran (THF), dioxane, and the like, chlorinated hydrocarbon solvents such as $CH_2Cl_2$, 1,1,2,2-tetrachloroethane (TCE), chloroform and the like, basic solvents such as pyridine and acidic solvents such as hexafluoroisopropanol (HFIP), trifluoroacetic acid (TFA), and the like.

Any known means may be employed to cast the solution. Preferably, the film is cast by means of a doctor knife. After casting, the solvent is evaporated from the solution within a dust free enclosure. The resulting, dried film is heated in vacuum to remove residual traces of solvent. The film preferably is heated from 50° to 200° C., most preferably 100° to 150° C., for 4 to 96 hours. The resulting polymer membrane is stripped from the glass plate by immersion in water, blotted dry, and further heated in a vacuum to remove any residual water prior to evaluating the permselectivity of the resulting membrane.

The membranes of the invention may be employed in a variety of gas separations. Gas separations in which the membranes may be employed include, but are not limited to $O_2/N_2$, $H_2/CH_4$, $He/N_2$, $CO_2/CH_4$, $CO_2/H_2$, and the like.

The performance of the membranes is measured in terms of permselectivity. The permselectivity of a membrane for separating a two-component fluid mixture is defined as the ratio of the rate of passage of the first component of the mixture through the membrane to the rate of passage of the second component. In the case of a two-component mixture of $O_2$ and $N_2$, the rate of passage, that is, permeability, of a first component such as oxygen, expressed as $P(O_2)$, is measured in units of centiBarrers (cB) where:

$$cB = \frac{(10^{-12} cm^3 (STP)) (cm)}{(cm^2) (sec) (cm\ Hg)}$$

where $cm^3(STP)$ is the volume of permeated gas at standard temperature and pressure, (cm) is the thickness of the membrane film, ($cm^2$) is the area of the membrane film, (sec) is the time in seconds of the permeation measurement, and cm Hg is the pressure of the feed gas. Thus, for a mixture of $O_2$ and $N_2$, the permselectivity of a membrane for oxygen/nitrogen separation is expressed as the ratio of permeabilities of $O_2/N_2$, that is, $P(O_2)/P(N_2)$.

The permselectivity of the membrane for a mixture of $O_2$ and $N_2$ can be evaluated by a high pressure filter holder. The holder is modified so that the high-pressure side of the membrane can be continually swept with 21:79 molar volume mixture of oxygen/nitrogen at 500 psig. The conversion of feed gas, that is the ratio of permeate volume to feed volume per unit time, is kept under 1%.

The permeate gas composition is determined by evacuating the permeate side of the membrane down to 5-20 mmHg with a vacuum pump connected through a gas chromatograph sample loop. The gas chromatograph employed has a 72"×⅛" 60–80 mesh 5A molecular sieve column. Permeation rates are determined according to the method of W. J. Ward III et al., "Ultrathin Silicone/Poly-carbonate Membranes for Gas Separation Process", *J. Membrane Sci.*, 1 (1976) 99, hereby incorporated by reference. Measurements of permeation rates are taken over several hours to ensure steady state permeation conditions.

Without further elaboration, it is believed that one skilled in the art, using the preceding description, can utilize the present invention to its fullest extent. The following preferred specific embodiments are, therefore, to be construed as merely illustrative, and not limitative of the remainder of the disclosure in any way whatsoever. In the following examples, all temperatures are set forth in degrees Celsius; unless otherwise indicated, all parts and percentages are by weight.

Preparation of 5-t-Butylisophthaloyl chloride 5-t-Butylisophthaloyl chloride (BIPC) is prepared in the following manner. A mixture of 250 g of 5-t-butylisophthalic acid, 460 g of phosphorus pentachloride and 500 ml of chlorobenzene is stirred in a round-bottom flask with a cold water condenser and drying tube and heated until gas evolution begins. Heat then is removed and the mixture stirred for 16 hours. The mixture then is heated to reflux for 1 hour, and the solvents are distilled off under reduced pressure. 5-t-Butylisophthaloyl chloride is obtained (247.1 g) by distillation of the resulting product at 118°–122° C. and 0.2 mmHg.

EXAMPLE 1

A membrane of a copolyester of 5-t-butylisophthaloyl chloride and t-butylhydroquinone (TBH) is prepared in the following manner. A solution of 6.395 g of t-butylhydroquinone (TBH) in 11 ml of triethylamine and 60 ml of methylene chloride is stirred at reflux under nitrogen as 9.977 g of BIPC in 20 ml of methylene chloride is added over 11 minutes. An additional 0.3 g of (BIPC) in 2 ml of methylene chloride is added over the next 3 hours. Then, an additional 11 ml of triethylamine is added and the mixture is stirred under reflux for 60 hours. The polymer is dissolved in 125 ml of chloroform, and the polymer then is precipitated into 750 ml of methanol in a blender. The product sequentially is washed with water, and methanol, and dried to yield 10.35 g of BIPC/TBH copolyester. The membrane has the following properties: n inh =0.72 dL/g (o-dichlorobenzene).

An eight percent solution of the BIPC/TBH polyester in o-dichlorobenzene is spread onto a glass plate using doctor blade knife with a clearance of 15 mil. The solvent is evaporated over a period of 16 hours under vacuum at 135° C. to provide a BIPC/TBH polyester film with a thickness of 0.9 mil. The permselectivity of the film is evaluated as described above with a 21:79 mixture of oxygen and nitrogen at 500 psig. The permeate side of the film is maintained at 20 mmHg during the test. The $O_2/N_2$ permselectivity, $P(O_2/N_2)$, is determined to be 5.59 and the $P(O_2)$ is determined to be 700 cB.

COMPARATIVE EXAMPLE 1

This example illustrates the importance of BIPC to providing polyester membranes with high flux and selectivity.

A first solution of 9.131 g of t-butylhydroquinone (TBH), 15.7 ml of triethylamine, and 70 ml of methylene chloride is stirred at reflux under nitrogen as a second solution of 11.149 g of a second solution of a 70:30 blend of isophthaloyl chloride/terephthaloyl chloride (ICl/TCl) in 20 ml of methylene chloride is added over 5 hours. All but 1 ml of this second solution is added over the first 10 minutes. Immediately upon completing the addition of the ICl/TCl solution, an additional 15 ml of triethylamine is added. This is followed by adding 0.3 g of ICl/TCl in 2 ml of methylene chloride over the next 4 hours. The mixture is stirred at room temperature for 16 hours and then precipitated into 700 ml of methanol. The precipitate sequentially is washed with water and methanol and dried to yield 12.5 g of ICl/TCl/TBH polyester. The properties of the polyester are: n inh =0.47 dL/g (pyridine).

A 15 -w/v percent solution of the ICl/TCl/TBH polyester in pyridine is spread onto a glass plate using a doctor blade with a 15 -mil clearance. The solvent is evaporated from the film under vacuum at 135° C. over a period of 16 hours. The permselectivity of the resulting 1.8 -mil film is evaluated as described above with a 21:79 mixture of oxygen and nitrogen at 500 psig. The permeate side of the film is maintained at 15 mmHg during the test. The $P(O_2/N_2)$ is determined to be 5.72, and the $P(O_2)$ is determined to be 48 cB. This permeability is significantly less than the corresponding value of Example 1 that employs BIPC.

EXAMPLE 2

A solution of 2.59 g of BIPC in 10 ml of methylene chloride is added to a stirred solution of 2.28 g of bisphenol A (2,2-bis(4-hydroxyphenyl)-propane) (BPA), and 2.8 ml of triethylamine in 50 ml of methylene chloride, under nitrogen. This solution is stirred for 2 hours and then allowed to stand for 16 hours. The resultant polyester BIPC/BPA is isolated by blending with methanol, sequentially washing with methanol and water, and oven drying to yield 4.0 g of BIPC/BPA. The properties of the polyester are: n inh =0.54 dL/g (NMP).

A 13-w/v percent solution of the BIPC/BPA polyester in hexfluoroisopropanol (HFIP) is spread onto a TEFLON sheet with a 20-mil clearance doctor knife, and heated in a vacuum at 80° C. for 4 days. The resultant 1.9-mil film is evaluated as described above under 500 psig of 21:79 oxygen/nitrogen. The $P(O_2/N_2)$ is determined to be 5.23 and the $P(O_2)$ is determined to be 410 cB.

EXAMPLE 3

A solution of 1.528 g of BIPC in 30 ml of methylene chloride is added under nitrogen over 30 minutes to a stirred solution of 14.963 g of bisphenol AF (2,2-bis(4-hydroxyphenyl)-1,1,1,3,3,3-hexafluoropropane) (BPAF) and 16 ml of triethylamine in 100 ml of methylene chloride. The resultant viscous polymer is blended with methanol, sequentially washed with methanol and water, and oven dried (100 C) to yield 22.4 g of BIPC/BPAF. The polymer has the following properties: n inh =0.93 dL/g (tetrachloroethane).

A 12-w/v percent solution of BIPC/BPAF in pyridine is spread onto a glass plate with a 15-mil doctor knife and heated in vacuum at 135° C. for 16 hours. The resultant 1.5-mil film is tested under 500 psig of a mixture of 21:79 oxygen/nitrogen. The $P(O_2/N_2)$ is determined to be 4.19 and the $P(O_2)$ is determined to be 1200 cB.

EXAMPLE 4

A solution of 10.954 g of BIPC in 30 ml of methylene chloride is added over 35 min to a stirred solution of 4.654 g of resorcinol and 12 ml of triethylamine in 120 ml of methylene chloride under nitrogen. A solution of 0.15 g of BIPC in 2 ml of methylene chloride then was added to the mixture at a rate of 2 drops every 15 minutes over an 8-hour period. The mixture is stirred for 16 hours and was then blended with 700 ml of methanol. The precipitated polymer is filtered, washed extensively with water and methanol in sequence, and air- and oven-dried (100° C.) to yield 11.8 g of BIPC/resorcinol polyester: n inh =0.48 dL/g (pyridine).

A 12-w/v per<cent solution of the BIPC/resorcinol polyester in o-dichlorobenzene was spread onto a glass plate with a doctor knife (15-mil clearance); the solvent was allowed to evaporate overnight in an oven (100° C.) under partial vacuum/nitrogen purge. The 1.1-mil film was tested under 500 psig of 21:79 oxygen/nitrogen: $P(O_2/N_2)$ =6.73; $P(O_2)$ =130 cB.

EXAMPLES 5-11

Homopolyesters of BIPC with the following diol monomers are made according to conditions analogous to Example 4. The diol monomers include 2-methylresorcinol, tetrachlorobisphenol A (2,2-bis(3,5-dichloro-4-hydroxyphenyl)propane), tetrabromobisphenol A (2,2-bis(3,5-dibromo-4-hydroxyphenyl)propane), tetramethylbisphenol A (2,2-bis(3,5-dimethyl-4-hydroxyphenyl)propane), tetramethylbisphenol AF (2,2-bis(3,5-dimethyl-4-hydroxyphenyl)-1,1,1,3,3,3-hexafluoropropane), 4,4'-dihydroxybiphenyl, and 9,9-bis(trifluoromethyl) xanthene-3,6-diol. The permeation data for these polymers is summarized in Table 1.

TABLE 1

| Permeability of Homopolyesters of BIPC and Diol | | | |
|---|---|---|---|
| Example # | Diol | n inh, dL/g (solvent) | $P(O_2/N_2)$ | $P(O_2)$ cB |
| 5 | 2-methylresorcinol | 1.10 (TCE) | 6.15 | 170 |
| 6 | tetrachlorobisphenol A | 0.25 (pyridine) | 5.53 | 600 |
| 7 | tetrabromobisphenol A | 0.62 (NMP) | 5.85 | 520 |
| 8 | tetramethylbisphenol A | 0.41 ($CH_2Cl_2$) | 4.71 | 1100 |
| 9 | tetramethylbisphenol AF | 0.42 (pyridine) | 4.03 | 3200 |
| 10 | dihydroxybiphenyl | 1.25 (NMP) | 4.09 | 600 |
| 11 | 9,9-bis(trifluoromethyl)-xanthene-3,6-diol | 0.17 (pyridine) | 3.90 | 2300 |

EXAMPLES 12-16

Copolyesters of BIPC with diol monomers can be made analogously to the homopolyesters of Examples 5-11. The composition ratios for the diols are weight ratios. Copolyesters of BIPC are useful because these copolyesters may have permeation properties similar to one of the corresponding homopolymers. Also, the copolymers may have improved solubility in solvents commonly employed for membrane fabrication.

The copolyesters of Examples 12-16 are made according to the conditions of Example 4. Permeation data are summarized in Table 2.

TABLE 2

| Permeability of Copolyesters of BIPC and Diols | | | |
|---|---|---|---|
| Example # | Diols | n inh, dL/g (solvent) | $P(O_2/N_2)$ | $P(O_2)$ cB |
| 12 | resorcinol/hydroquinone (3:1) | 0.46 (pyridine) | 5.91 | 200 |
| 13 | 1,5-naphthalenediol/resorcinol (3:1) | 1.70 (HFIP) | 5.84 | 210 |

TABLE 2-continued

Permeability of Copolyesters of BIPC and Diols

| Example # | Diols | n inh, dL/g (solvent) | P(O₂/N₂) | P(O₂) cB |
|---|---|---|---|---|
| 14 | resorcinol/bisphenol A (9:1) | 0.69 (NMP) | 6.18 | 220 |
| 15 | resorcinol/4-bromoresorcinol (9:1) | 0.56 (NMP) | 6.71 | 210 |
| 16 | resorcinol/2-methylresorcinol (9:1) | 0.38 (CH₂Cl₂) | 6.66 | 190 |

EXAMPLE 17

This example illustrates that aromatic dicarboxylic acid chlorides may be combined with BIPC to make polyesters with surprising gas separation capabilities.

A copolyester of BIPC and a mixture of iso and terephthaloyl chloride is made according to the conditions of Example 4 and 3 parts of BIPC and 1 part of a 70:30 mixture of isophthaloyl and terephthaloyl chlorides with resorcinol. The properties of the resultant copolyester are given in Table 3.

TABLE 3

Permeability of Copolyesters of BIPC and Aromatic Dicarboxylic Acid Chlorides

| n inh, dL/g (solvent) | P(O₂/N₂) | P(O₂) cB |
|---|---|---|
| 0.54 (NMP) | 6.23 | 80 |

EXAMPLE 18

In a round bottom flask with dropping funnel, stirrer and nitrogen inlet, 41.52 g of m-phenylenediamine (MPD) in 400 ml of dry N-methyl-2-pyrrolidone (NMP) is stirred under nitrogen at room temperature as all but 5 ml of a solution of 100.3 g of BIPC in 60 ml of NMP is added over two minutes. The solution is stirred for 15 minutes as the temperature rises to 85° C. The remaining BIPC solution then is added at a rate of about 1 ml/10 minutes while stirring. The resulting viscous solution is blended at high speed within 2 liters of hot water (50° C.) to precipitate the BIPC/MPD polyamide polymer into a suspension. The polymer suspension is filtered and washed extensively with water, and then methanol. Air and oven-drying (150 C/vacuum) yielded 112.3 g of BIPC/MPD polyamide; n inh =1.18 dL/g (NMP).

A film of the polyamide is formed by casting a 15-wt percent solution of BIPC/MPD in dimethylformamide (DMF) solvent onto a glass plate using a 15-mil clearance doctor knife. The solvent is evaporated from the film under vacuum at 160° C. for 42 hours. The thickness of the resulting film is 1.2 mil. The permselectivity of the film is evaluated as described above with a 21:79 mixture of oxygen and nitrogen at 500 psig. The permeate side of the film is maintained at 20 mmHg during the test. The P(0 is determined to be 6.29 and the P(02) is determined to be 180 cB.

EXAMPLE 19

A solution of 3.50 g of diaminomesitylene, (DAM; 2,4,6-trimethyl-1,3-phenylenediamine), and 7.0 ml of pyridine in 20 ml of NMP, is stirred under nitrogen as all but 1 ml of a solution of 5.98 g of BIPC in 10 ml of NMP is added over 1 minute. The mixture is stirred for 15 minutes as the temperature rises to 65° C. The remainder of the BIPC solution is slowly added over an hour. The polymer solution is blended with 500 ml of water, filtered and extensively washed with water, and methanol. The product is dried to yield 7.55 g of BIPC-/DAM polyamide; n inh =0.60 dL/g (DMF).

A 5-w/v percent solution of BIPC/DAM polyamide in DMF solvent is spread onto a glass plate using a 25-mil knife clearance doctor knife, and the solvent is evaporated from the film under vacuum at 35° C. for 16 hours. The resulting film has a thickness of 0.9 mil. The permselectivity of the film is evaluated as described above with a 21:79 mixture of oxygen and nitrogen at 500 psig. The permeate side of the film is maintained at 20 mmHg during the test.

The P(O₂/N₂) is determined to be 6.30 and the P(O₂) is determined to be 160 cB.

COMPARATIVE EXAMPLE 2

This example illustrates the lower permeability of polyamides which do not include BIPC.

A polyamide is made from DAM and a 70:30 mixture of iso- and terephthaloyl chlorides (I/T) under the conditions of Example 18; (I/T)-DAM polyamide n inh =1.41 dL/g (NMP).

A 10 wt % solution of the (I/T)-DAM polyamide in NMP solvent is spread onto a glass plate using a 15-mil clearance doctor knife, and the solvent is evaporated from the film under vacuum at 135° C. for 16 hours. The film thickness is 1.0 mil. The P(O₂/N₂) is determined to be 7.32 and the P(O₂) is determined to be 17 cB.

EXAMPLES 20-25

Polyamides of BIPC with the following diamine monomers are made under the conditions of Example 18: bisaniline A (BAA) (2,2-bis(4-aminophenyl)propane); bisaniline AF (BAAF) (2,2-bis(4-aminophenyl)-1,1,1,3,3,3-hexafluoropropane); oxydianiline (ODA) (4-aminophenyl ether); p-phenylenediamine (PPD); diaminodurene (DAD) (2,3,5,6-tetramethyl-1,4-phenylenediamine); and 1,5-naphthalenediamine (1,5-ND). The permeation properties of the resulting polyamide membranes are summarized in Table 3.

TABLE 3

Permeability of Polyamides of BIPC and Selected Diamine Monomers

| Example # | Diamine | n inh, dL/g (solvent) | P(O₂/N₂) | P(O₂) cB |
|---|---|---|---|---|
| 20 | BAA | 0.45 (DMF) | 6.14 | 130 |
| 21 | BAAF | 0.70 (DMF) | 4.59 | 800 |
| 22 | ODA | 1.10 (DMF) | 6.12 | 100 |
| 23 | PPD | 0.62 (DMF) | 5.68 | 150 |
| 24 | DAD | 1.60 (HFIP) | 5.69 | 220 |
| 25 | 1,5-ND | 0.82 (TFA) | 6.99 | 120 |

From the foregoing description, one skilled in the art can easily ascertain the essential characteristics of this invention, and without departing from the spirit and scope thereof, can make various changes and modifications of the invention to adapt it to various usages and conditions.

I claim:

1. A process for preparing a selectively permeable membrane for fluid separations comprising,
   preparing a solution of dicarboxylic acid halide,
   mixing said solution with a monomer selected from the group of aromatic diols, aliphatic diols, aromatic diamines, aliphatic diamines, and biphenols, or mixtures thereof to from a second solution.
   treating said second solution to from a polymer of said dicarboxylic acid halide and said monomer, forming said second solution of said polymer, and
   casting said second solution of said polymer to form said selectively permeable membrane.

2. The process of claim 1 wherein said dicarboxylic acid halide is selected from the group of -t-butylisophthaloyl chloride, 4-t-butylisophthaloyl chloride, and 5-t-butylisophthaloyl chloride.

3. The process of claim 2 wherein said dicarboxylic acid halide is 5-t-butylisophthaloyl chloride.

4. The process of claim 3 wherein said aromatic diol monomer is selected group of t-butylhydroquinone, resorcinol, hydroquinone, tetrachlorobisphenol A, tetrabromobisphenol A, tetramethylbisphenol A, tetraemthylbisphenol AF, 4,4,-dihydroxybiphenyl, 9,9-bis(trifluoromethyl)xanthene-3,6-diol, and 2-methylresorcinol.

5. The process of claim 4 wherein said aromatic diols are selected from the group of resorcinol, 2-methylresorcinol, and tetrabromobisphenol A.

6. The process of claim 3 wherein said aromatic diamine is selected from the group of m-phenylenediamine, diaminomesitylene, 2-bis(4-aminophenyl)-1,1,1,3,3,3-hexafluoropropane, 4-aminophenylether, p-phenylenediamine, 2,3,5,6-tetramethyl-1,4-phenylenediamine, and 1,5-naphthalenediamine.

7. The process of claim 3 wherein said aromatic diamine monomer is selected from the group of m-phenylenediamine, diaminomesitylene, and 1,5-naphthalenediamine.

8. The process of claim 1 wherein said aromatic diols are selected from the group of t-butylhydroquinone, resorcinol, hydroquinone, tetra-chlorobisphenol A, tetrabromobisphenol A, tetramethylbisphenol A, tetramethylbisphenol AF, 4,4'-dihydroxybiphenyl, 9,9-bis(trifluoromethyl)xanthene-3,6-diol, and 2-methylresorcinol.

9. The process of claim 1 wherein said romatic diamines are selected from the group of m-phenylenediamine, diaminomesitylene, bisaniline A, bisaniline AF, 4-aminophenyl ether, p-phenylenediamine, 2,3,5,6-tetramethyl-1,4-phenylenediamine, and 1,5-naphthalenediamine.

10. A selectively permeable membrane for fluid separations comprising a polymer derived from a dicarboxylic acid halide and a monomer selected from the group of aromatic diols, aromatic diamines, aliphatic diols, biphenols, aliphatic diamines, or mixtures thereof.

11. The membrane of claim 10 wherein said dicarboxylic acid halide is selected from the group of -t-butylisophthaloyl chloride, 4-t-butylisophthaloyl chloride, and 5-t-butylisophthaloyl chloride.

12. The membrane of claim 11 wherein said dicarboxylic acid halide is 5-t-butylisophthaloyl chloride.

13. The membrane of claim 12 wherein said aromatic diol monomer is selected from the group if resorcinol, 2-methylresorcinol, and tetrabromobisphenol A.

14. The membrane of claim 12 wherein said aromatic diamine monomer is selected from the group of m-phenylenediamine, diaminomesitylene, and 1,5-naphthalenediamine.

15. The membrane of claim 10 wherein said aromtic diols are selected from the group of t-butylhydroquinone, resorcinol, hydroquinone, tetrachlorobisphenol A, tetrabromobisphenol A, tetramethylbisphenol A, tetramethylbisphenol AF, 4,4'-dihydroxybiphenyl, 9,9-bis(trifluoromethyl)xanthene-3,6-diol, and 2-methylresorcinol.

16. The membrane of claim 10 wherein said aromatic diamines are selected from the group of m-phenylenediamine, diaminomesitrylene, 2,2-bis(4-aminophenyl)-1,1,1,3,3,3-hexafluoropropane, 4-aminophenyl ether, p-phenylenediamine, 2,3,5,6-tetramethyl-1,4-phenylenediamine, 1,5-naphthalenediamine.

17. The membranes of claim 10 wherein said membrane has the formula:

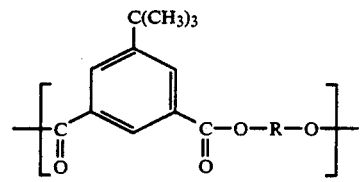

where R=divalent organic group.

18. The membranes of claim 17 wherein R is selected from the group of monocyclic and bicyclic aromatics.

19. The membrane of claim 18 wherein R is selected from the group of naphthalene and benzene.

20. The membrane of claim 10 wherein said membranes has the formula:

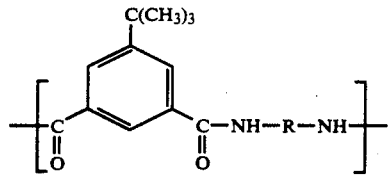

where R=divalent organic group.

21. The membrane of claim 20 wherein R is selected from the group of monocyclic and bicyclic aromatics.

22. The membrane of claim 21 wherein R is selected from the group of naphthalene and benzene.

23. A process of separating a mixture of gases wherein said mixture of gases contacts a membrane and the more permeable component of said gas mixture selectively passes through the membrane in order to separate said gas component from said gas mixture, the improvement comprising contacting said gas mixture with the membrane of any one of claims 10–22.

* * * * *

UNITED STATES PATENT AND TRADEMARK OFFICE
CERTIFICATE OF CORRECTION

PATENT NO. : 5,073,176

DATED : December 17, 1991

INVENTOR(S) : Samuel D. Arthur

It is certified that error appears in the above-identified patent and that said Letters Patent is hereby corrected as shown below:

COLUMN 11;

Claim 1, line 7, replace "from" with --form--.

Claim 2, line 15-16, replace "-t-butylisophthaloyl" with
    --2-t-butylisophthaloyl--.

Claim 4, line 24, replace "4,4,-dihydroxybiphenyl" with
    --4,4',-dihydroxybisphenyl--.

Claim 6, line 32, replace "2-bis(4-aminophenyl)" with
    --2,2-bis(4-aminophenyl)--.

Claim 9, line 48, replace "romatic" with --aromatic--.

Claim 11, line 61-62, replace "-t-butylisophthaloyl" with
    --2-t-butylisophthaloyl--.

COLUMN 12, line 10,

Claim 15, line 1, replace "aromtic" with --aromatic--.

Signed and Sealed this

Twenty-eighth Day of April, 1992

Attest:

HARRY F. MANBECK, JR.

*Attesting Officer*          *Commissioner of Patents and Trademarks*